(12) United States Patent
Wu et al.

(10) Patent No.: US 10,803,287 B2
(45) Date of Patent: Oct. 13, 2020

(54) FINGERPRINT IDENTIFICATION MODULE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chien-Hui Wu, Tainan (TW); Ming-Fu Yen, New Taipei (TW); Chen-Yu Tsai, Taipei (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 118 days.

(21) Appl. No.: 16/045,794

(22) Filed: Jul. 26, 2018

(65) Prior Publication Data

US 2019/0122022 A1 Apr. 25, 2019

Related U.S. Application Data

(60) Provisional application No. 62/576,688, filed on Oct. 25, 2017.

(51) Int. Cl.
*G06K 9/00* (2006.01)

(52) U.S. Cl.
CPC ....... *G06K 9/00053* (2013.01); *G06K 9/0002* (2013.01); *G06K 9/00087* (2013.01)

(58) Field of Classification Search
CPC ............. G06K 9/00053; G06K 9/0002; G06K 9/00087
See application file for complete search history.

(56) References Cited

U.S. PATENT DOCUMENTS

| | | | |
|---|---|---|---|
| 2011/0317886 A1* | 12/2011 | Matsuoka | G06K 9/00026 382/124 |
| 2017/0090593 A1* | 3/2017 | Cao | H01H 13/14 |
| 2017/0255275 A1* | 9/2017 | Demenschonok | G06F 3/021 |
| 2019/0073045 A1* | 3/2019 | Lei | G06K 9/00006 |
| 2019/0095004 A1* | 3/2019 | Son | G06K 9/00053 |

* cited by examiner

*Primary Examiner* — Utpal D Shah
(74) *Attorney, Agent, or Firm* — Li & Cai Intellectual Property (USA) Office

(57) ABSTRACT

A fingerprint identification module includes a keycap unit and a fingerprint identification chip. The keycap unit has an accommodating space and a first surface corresponding to the accommodating space. The fingerprint identification chip has a second surface. The fingerprint identification chip is disposed in the accommodating space, and at least a portion of the second surface of the fingerprint identification chip abuts against the first surface of the keycap unit.

14 Claims, 12 Drawing Sheets

FINGERPRINT IDENTIFICATION MODULE

CROSS-REFERENCE TO RELATED PATENT APPLICATION

This application claims priority from the U.S. Provisional Patent Application Ser. No. 62/576,688 filed Oct. 25, 2017, which application is incorporated herein by reference in its entirety.

FIELD OF THE DISCLOSURE

The present disclosure relates to a fingerprint identification module, and more particularly to a fingerprint identification module including a keycap unit and a fingerprint identification chip.

BACKGROUND OF THE DISCLOSURE

With the popularity of third-party payment, the use of the fingerprint identification module has also increased significantly. For example, a chip with fingerprint identification function can be integrated into various electronic devices to endow the electronic devices with pluralistic functions. However, when it comes to integrating a fingerprint identification function to a component having a pressing function, such as a key of a keyboard, conventional techniques still face technical problems that need to be overcome. For example, a fingerprint identification chip is often provided as an additional component to be disposed between a keycap, for being pressed by a user, and a support member, for supporting components such as a keycap and a circuit board. However, such an arrangement leads to poor adhesion between the fingerprint identification chip and other components, and incurs a relatively complicated manufacturing process.

SUMMARY OF THE DISCLOSURE

In response to the above-referenced technical issues, the present disclosure provides a fingerprint identification module. Through its structural design, the fingerprint identification module provided by the present disclosure incurs less manufacturing costs, and achieves better tightness between the keycap unit and the fingerprint identification chip.

One aspect of the present disclosure directs to a fingerprint identification module including a keycap unit and a fingerprint identification chip. The keycap unit has an accommodating space and a first surface corresponding to the accommodating space. The fingerprint identification chip has a second surface and is disposed in the accommodating space. At least a portion of the second surface of the fingerprint identification chip abuts against the first surface of the keycap unit.

In certain embodiments, the keycap unit further has a pressing surface, a supporting surface opposite to the pressing surface, and at least one supporting member integrally formed on the supporting surface. The accommodating space and the first surface are located between the pressing surface and the supporting surface. The first surface surrounds the accommodating space, and the fingerprint identification chip further has a sensing surface and a rear surface opposite to the sensing surface.

In certain embodiments, the accommodating space penetrates the keycap unit, and the sensing surface of the fingerprint identification chip is exposed from the accommodating space.

In certain embodiments, the accommodating space includes a groove recessed inwardly on the supporting surface, the groove has an opening surrounded by the supporting surface and a third surface corresponding to the opening, and a thin layer structure is disposed between the pressing surface of the keycap unit and the sensing surface of the fingerprint identification chip.

In certain embodiments, the sensing surface of the fingerprint identification chip abuts against the third surface of the groove.

In certain embodiments, the keycap unit further includes an adhesive layer, and the first surface is located on the adhesive layer.

In certain embodiments, the keycap unit has a plurality of through holes penetrating the keycap unit and connected between the pressing surface and the third surface.

In certain embodiments, the fingerprint identification module further comprising a photocured layer disposed on the pressing surface of the keycap unit and the sensing surface of the fingerprint identification chip.

In certain embodiments, the keycap unit includes a first fastening unit disposed on the supporting surface, and the fingerprint identification chip is fixed in the accommodating space through the first fastening unit.

In certain embodiments, the first fastening unit includes at least two first fastening members, each of the first fastening members has a first stopping surface abutting against at least a portion of the rear surface of the fingerprint identification chip so as to support the fingerprint identification chip.

In certain embodiments, the keycap unit includes a second fastening unit disposed on the first surface, the second fastening unit includes two second fastening members, each of the second fastening members has at least two second stopping surfaces, each of the at least two stopping surfaces abuts against the fingerprint identification chip, and the pressing surface of the keycap unit is flush with an upper surface of each of the second fastening members.

In certain embodiments, the fingerprint identification chip is fastened between the first fastening unit and the second fastening unit.

In certain embodiments, the fingerprint identification chip further has a sensing surface and a rear surface opposite to the sensing surface, the second surface surrounds the sensing surface and the rear surface, and the sensing surface produces a corresponding sensing signal according to a touch operation.

One of the beneficial effects of the present disclosure is that, through the technical features of "at least a portion of the second surface of the fingerprint identification chip abuts against the first surface of the keycap unit," the tightness between the fingerprint identification chip 2 and the keycap unit 1 can be ensured.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
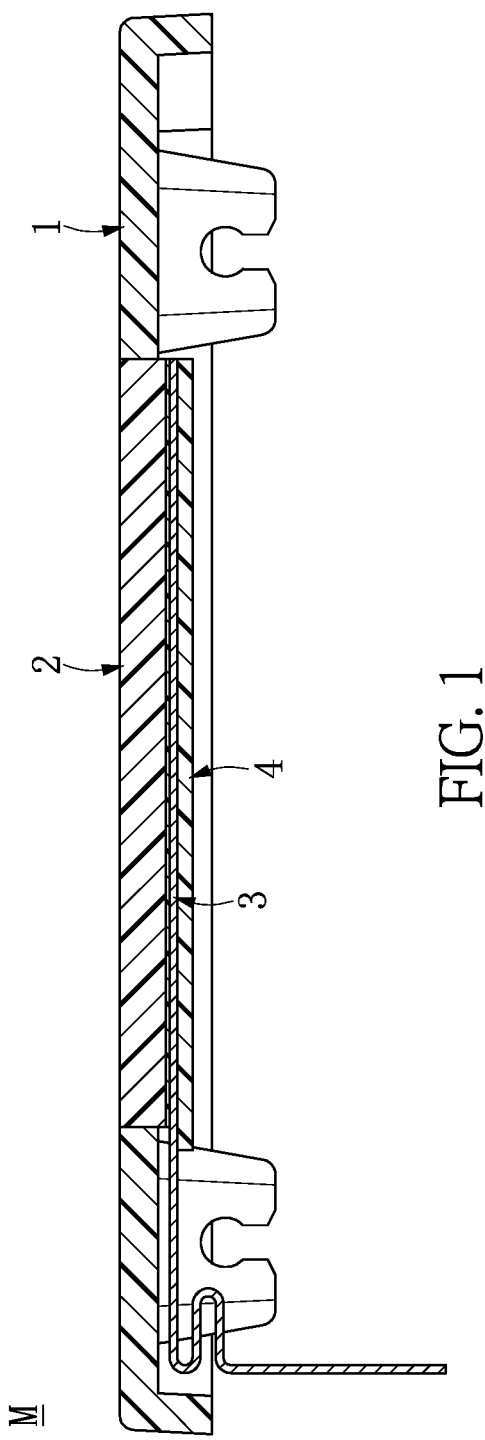
FIG. 1 is a cross-sectional assembled view of the fingerprint identification module according to one embodiment of the present disclosure.

The present disclosure is more particularly described in the following examples that are intended as illustrative only since numerous modifications and variations therein will be apparent to those skilled in the art. Various embodiments of the present disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing may be expressed in more than one way. Consequently, alternative language and synonyms may be used for any one or more of the terms discussed herein, and no special significance is to be placed upon whether or not a term is elaborated or discussed herein. Synonyms for certain terms may be provided. A recital of one or more synonyms does not exclude the use of other synonyms. The use of examples anywhere in this specification including examples of any terms discussed herein is illustrative only, and in no way limits the scope and meaning of the present disclosure or of any exemplified term. Likewise, the present disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including any definitions given herein, will prevail.

While numbering terms such as "first", "second" or "third" may be used in this disclosure to describe various components, signals or the like, the terms are for distinguishing one component from another component, or one signal from another signal only, and are not intended to, nor should they be construed to impose any other substantive descriptive limitations on the components, signals or the like.

Figure 2:
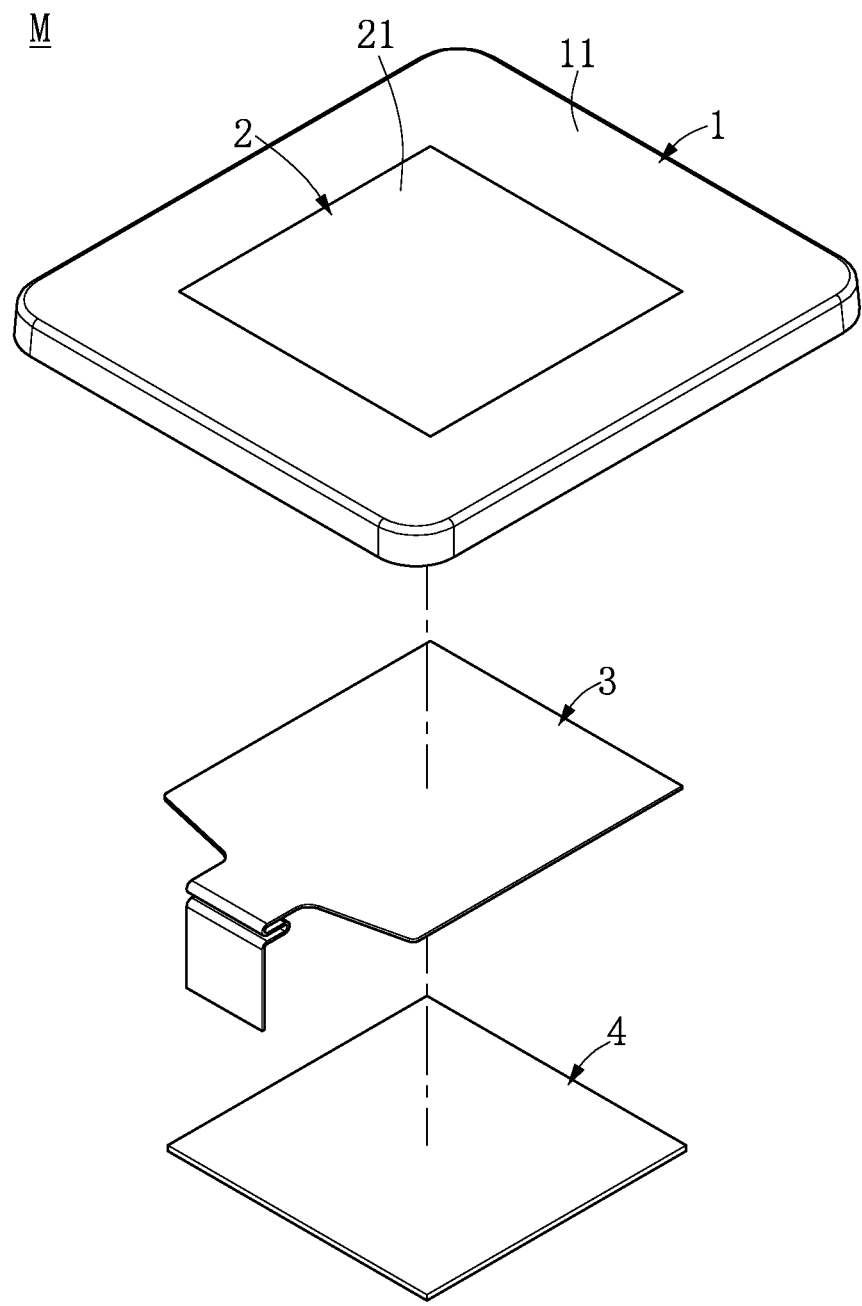
FIG. 2 is a perspective exploded view of the fingerprint identification module according to one embodiment of the present disclosure.
Figure 3:
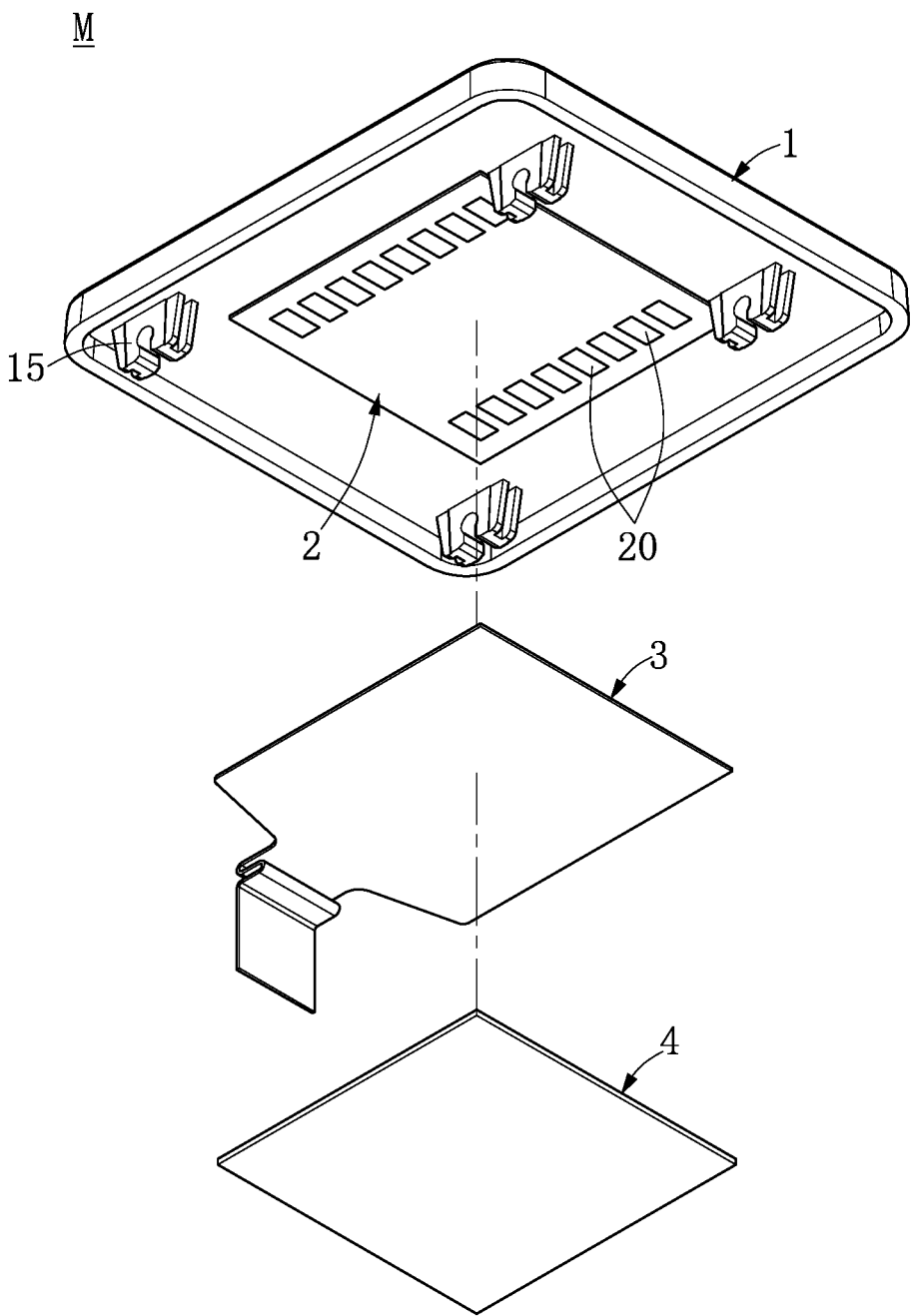
FIG. 3 is another perspective exploded view of the fingerprint identification module according to one embodiment of the present disclosure.

Referring to FIG. 1 to FIG. 3, an embodiment of the present disclosure provides a fingerprint identification module M. As shown in FIG. 1, the fingerprint identification module M includes a keycap unit 1, a fingerprint identification chip 2, a flexible circuit board 3, and a support board 4. As shown in FIG. 2 and FIG. 3, the fingerprint identification chip 2 is disposed between the keycap unit 1 and the flexible circuit board 3, and the flexible circuit board 3 is disposed between the fingerprint identification chip 2 and the support board 4.

The fingerprint identification module M provided by certain embodiments of the present disclosure can achieve not only the effect of fingerprint identification through the fingerprint identification chip 2, but also the functions of a key of a conventional keyboard through the keycap unit 1 and other components (for example, the flexibility circuit board 3) disposed below the keycap unit 1.

Specifically, in the present disclosure, the keycap unit 1 of the fingerprint recognition module M may be made of a plastic material. For example, the keycap unit 1 can be made of a material such as Polyoxymethylene (POM), Acrylonitrile Butadiene Styrene (ABS), Polycarbonate (PC), or other kinds of materials. In addition, the fingerprint identification chip 2 can be a fingerprint identification chip manufactured by using a plastic material as a substrate. However, neither the material of the keycap unit 1 nor the type of the fingerprint identification chip 2 is limited thereto.

Further, the fingerprint identification chip 2 can further have a plurality of solder pads 20 disposed on the rear surface 22 (shown in FIG. 4), and the flexible circuit board 3 can be electrically connected with the solder pads 20 of the fingerprint identification chip 2. In certain embodiments of the present disclosure, the flexible circuit board 3 can be connected with the solder pads 20 of the fingerprint identification chip 2 through an anisotropic conductive film (ACF, not shown in the figure) and a low-temperature hot pressing step.

In addition, the flexible circuit board 3 can also be connected with the support board 4 by an adhesive. For example, a commercially available adhesive can be used to bond the flexible circuit board 3 to the support board 4. In this way, the support board 4 can be used to support the flexible circuit board 3 and other components on the flexible circuit board 3 (for example, the keycap unit 1 and the fingerprint identification chip 2). It is noted that in certain embodiments of the present disclosure, the support board 4 is an optional component. For example, the keycap unit 1 can also be directly connected with other components via its supporting members 15 (shown in FIGS. 3 and 4). The details of the supporting members 15 will be described later. The support board 4 can be made of a metal material or a plastic material, and the metal material can be, for example, iron or an iron alloy. However, the present disclosure is not limited thereto.

Next, described in detail as follows are the arrangement relationship between the keycap unit 1 and the fingerprint identification chip 2 in the fingerprint identification module M, and the respective structural designs of the keycap unit 1 and the fingerprint identification chip 2 provided in certain embodiments of the present disclosure.

First Embodiment

Figure 4:
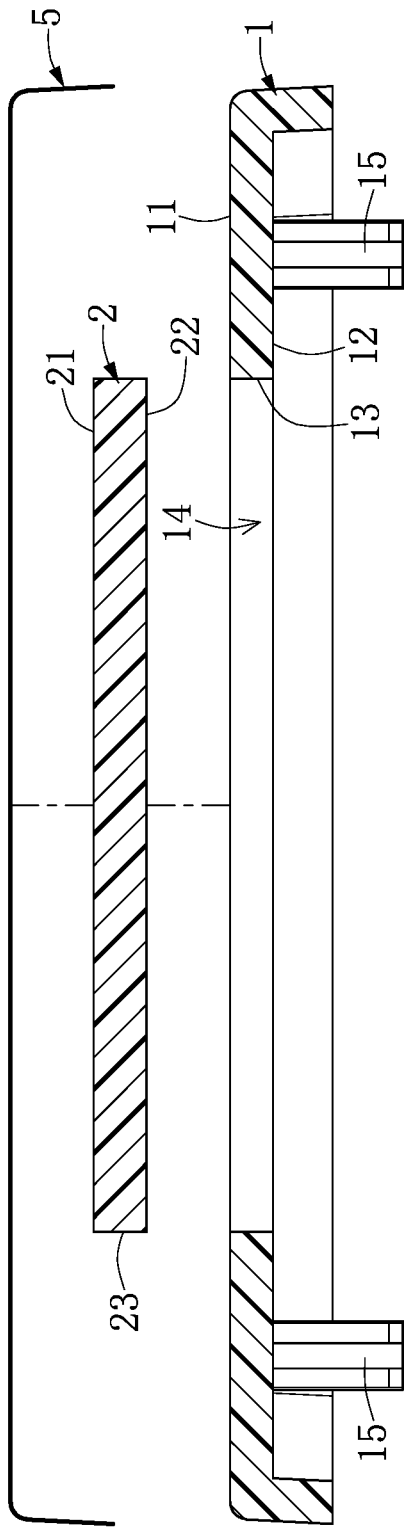
FIG. 4 is a cross-sectional exploded view of a keycap unit, a fingerprint identification chip and a photocured layer of a fingerprint identification module according to a first embodiment of the present disclosure.

Reference is made to FIG. 4, which is a cross-sectional exploded view of the keycap unit 1, the fingerprint identification chip 2, and a photocured layer 5 in the fingerprint identification module M provided by a first embodiment of the present disclosure. As shown in FIG. 4, the fingerprint identification module M provided by the present disclosure can further include the photocured layer 5. The photocured layer 5 can be disposed on the keycap unit 1 and the fingerprint identification chip 2. The photocured layer 5 is made of a photocurable material. For example, the photocurable material may be an UV-curable material. The photocuring layer 5 can provide the fingerprint identification module M with protective effects, such as dirt-proof, dust-proof, water-repellent, and fingerprint-proof effects.

As described above, the fingerprint identification module M provided by the embodiments of the present disclosure has not only the function of fingerprint identification through the fingerprint identification chip 2, but also the functions of a key of a conventional keyboard through the keycap unit 1, as the keycap unit 1 can be pressed by a user. Therefore, as shown in FIG. 4, the keycap unit 1 of the fingerprint identification module M has a pressing surface 11 and a supporting surface 12 opposite to the pressing surface 11. In other words, the pressing surface 11 is a surface for a user's finger to press thereon, and the supporting surface 12 is for supporting the keycap unit 1 on other components (for example, the flexible circuit board 3 and/or the support board 4).

In addition, as shown in FIG. 4, the keycap unit 1 further includes a first surface 13 located between the pressing surface 11 and the supporting surface 12, and an accommodating space 14 corresponding to the first surface 13. For example, the first surface 13 surrounds the accommodating space 14. Therefore, the first surface 13 can be an inner surrounding surface of the keycap unit 1. The accommodating space 14 of the keycap unit 1 is used for accommodating the fingerprint identification chip 2, and the first surface 13 defines the accommodating space 14. The accommodating space 14 can be formed as a through hole or a groove. Different embodiments of the accommodating space 14 will be described later.

In addition, the keycap unit 1 also has at least one supporting member 15 disposed on the supporting surface 12. The number and the manner of forming the supporting members 15 are not limited in the embodiments of the present disclosure. For example, the supporting member 15 can be integrally formed on the supporting surface 12, such as being integrally formed at the time of forming the keycap unit 1. As shown in FIG. 3, the keycap unit 1 can have four supporting members 15, so that the keycap unit 1 has a variety of features at the same time, including that of accommodating the fingerprint identification chip 2, being pressed by a user, and being supported on other components (for example, the support board 4) through the supporting members 15. In certain embodiments, the supporting members 15 can be used to interconnect with the scissor structures of the keys of a keyboard.

By arranging the supporting member 15 on the supporting surface 12 of the keycap unit 1, the fingerprint identification module M of the present disclosure has lower assembling complexity and lower manufacturing costs than that of a conventional procedure forming the keycap unit 1 and the supporting member 15 separately and then assembling the separately formed components.

Referring again to FIG. 4, the fingerprint identification chip 2 has a sensing surface 21, a rear surface 22 opposite to the sensing surface 21, and a second surface 23 surrounding the sensing surface 21 and the rear surface 22. In other words, the second surface 23 surrounds the sensing surface 21 and the rear surface 22. In addition, the sensing surface 21 generates a corresponding sensing signal according to a touch operation. For example, a user's finger touches the sensing surface 21, and then the fingerprint identification chip 2 can accordingly identify a fingerprint of the user.

In certain embodiments, the fingerprint identification chip 2 is a cuboid, each of the sensing surface 21 and the rear surface 22 of the fingerprint identification chip 2 can respectively be the upper surface and the lower surface of the cuboid, and the second surface 23 of the fingerprint identification chip 2 can be the outer surrounding surface encompassing the four side surfaces of the cuboid.

Figure 10:
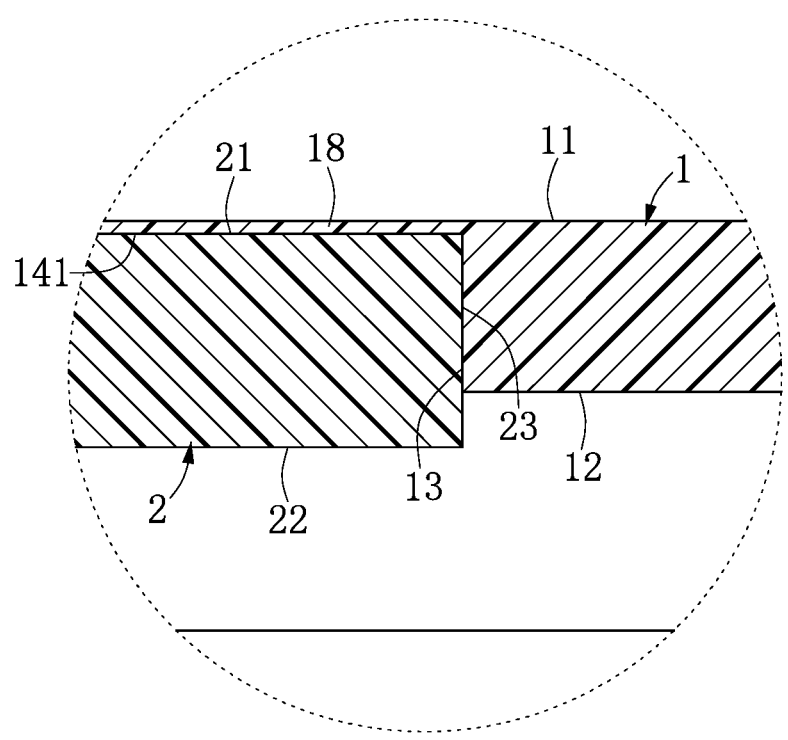
FIG. 10 is an enlarged view of an assembly of the structure shown in FIG. 9 and the fingerprint identification chip.

In certain embodiments of the present disclosure, the fingerprint identification chip 2 is disposed in the accommodating space 14 of the keycap unit 1, and at least a part of the second surface 23 of the fingerprint identification chip 2 is closely adjacent to the first surface 13 of the keycap unit 1. For example, when the fingerprint identification module M of the present disclosure is arranged in such a way that the pressing surface 11 and the sensing surface 21 are both parallel to a horizontal plane, and the height of the first surface 13 in the vertical direction can be smaller than the height of the second surface 23 (that is, the side surfaces of the cuboid) of the fingerprint identification chip 2 in the vertical direction. As a result, at least a portion of the second surface 23 of the fingerprint identification chip 2 abuts against the first surface 13 of the keycap unit 1. For example, as shown in FIG. 10 of the present disclosure, a portion of the second surface 23 of the fingerprint identification chip 2 abuts against the first surface 13 of the keycap unit 1, and the other portion of the second surface 23 is exposed out via the keycap unit 1. In certain embodiments of the present disclosure, the rear surface 22 of the fingerprint identification chip 2 is flush with the supporting surface 12 of the keycap unit 1.

In the first embodiment of the present disclosure, in order to make at least a portion of the second surface 23 of the fingerprint identification chip 2 be closely adjacent to the first surface 13 of the keycap unit 1, an insert molding technique can be adopted to form an assembly of the keycap unit 1 and the fingerprint identification chip 2. Insert molding is one of the injection molding technologies, and mainly involves setting an insertion member in a mold cavity first, and then filling the mold cavity with a plastic material so that the insertion member and the plastic material filled in the mold cavity are combined with each other to form the assembly.

Specifically, when an insert molding technique is used to form the assembly of the keycap unit 1 and the fingerprint identification chip 2, the fingerprint identification chip 2 can be disposed in the mold cavity as an insertion member first, and then the plastic material (such as ABS, POM, or PC, as described previously) is used to fill the mold cavity key to form the keycap unit 1. As a result, the fingerprint identification chip 2 and the keycap unit 1 are disposed closely adjacent to (abutting against) each other without a gap formed therebetween.

It should be noted that, when the keycap unit 1 and the fingerprint identification chip 2 are arranged closely adjacent to each other without any gap formed therebetween, the fingerprint identification module M provided by the embodiments of the present disclosure can achieve the effects of preventing static electricity and preventing dust from entering any gap in the assembly of the keycap unit 1 and the fingerprint identification chip 2. In addition, forming the assembly of the keycap unit 1 and the fingerprint identification chip 2 by insert molding can make the structure of the fingerprint identification module M sturdier with less assembling costs.

Still, in the embodiments of the present disclosure, the keycap unit 1 can be formed first, and then the keycap unit 1 and the fingerprint identification chip 2 are combined. However, the present disclosure is not limited thereto. In addition, it should be noted that FIG. 4 is only a schematic diagram of one configuration of the first embodiment of the present disclosure. In the first embodiment, the specific structure of the keycap unit 1 and the setting relationship between the keycap unit 1 and the fingerprint identification chip 2 can be further adjusted.

In the first embodiment, the accommodating space 14 in the keycap unit 1 penetrates the keycap unit 1. In other words, the keycap unit 1 has a hole structure forming the accommodating space 14 for accommodating the fingerprint identification chip 2. In this way, the sensing surface 21 of the fingerprint identification chip 2 is exposed from the pressing surface 11 of the keycap unit 1 through the accommodating space 14.

Figure 5:
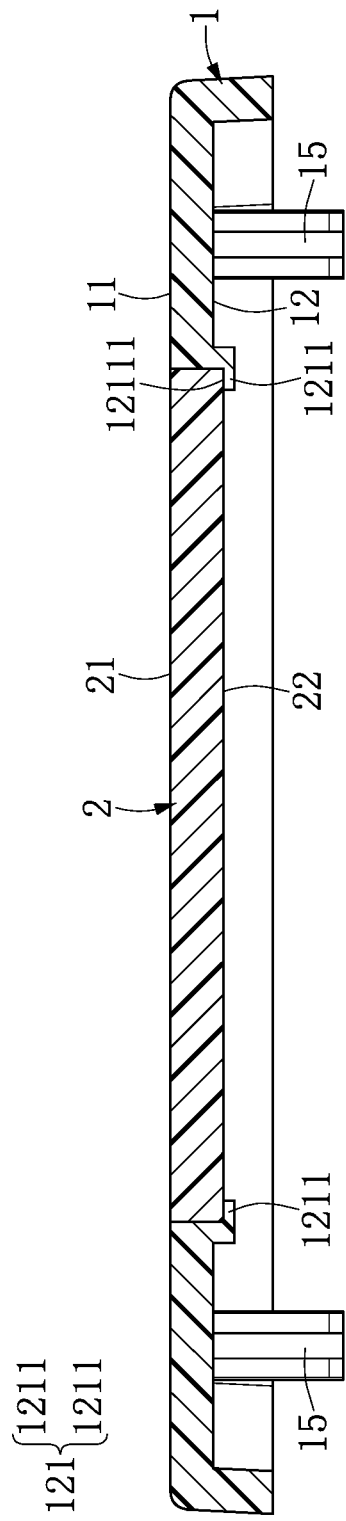
FIG. 5 is a cross-sectional assembled view of the keycap unit and the fingerprint identification chip of the fingerprint identification module according to the first embodiment of the present disclosure.

Next, reference is made to FIG. 5, which is a schematic cross-sectional view of an assembly of the keycap unit 1 and the fingerprint identification chip 2 in the fingerprint identification module M provided by the first embodiment of the present disclosure. By comparing FIG. 5 with FIG. 4, it can be seen that one of the differences between the embodiments shown in FIG. 5 and FIG. 4 relates to the structural design of the keycap unit 1. In the embodiment shown in FIG. 4, the keycap unit 1 can be in contact with (closely adjacent to or abutting against) the fingerprint identification chip 2 only through the first surface 13, so that the keycap unit 1 and the fingerprint identification chip 2 are fixed to each other to form the assembly.

In the embodiment shown in FIG. 5, the keycap unit 1 also has a first fastening unit 121 disposed on the supporting surface 12. The fingerprint identification chip 2 is fixed in the accommodating space 14 by the first fastening unit 121. Specifically, when the assembled keycap unit 1 and the fingerprint identification chip 2 are combined, both the keycap unit 1 and the fingerprint identification chip 2 bear a downward pressing force (for example, a force exerted by the downward pressing finger(s) of a user), which may cause the fingerprint identification chip 2 to move downward and disengage from the keycap unit 1. Therefore, providing the first fastening unit 121 on the supporting surface 12 of the keycap unit 1 can more effectively fix the fingerprint identification chip 2 in the accommodating space 14.

As shown in FIG. 5, the first fastening unit 121 can include two first fastening members 1211. The two first fastening members 1211 can be respectively disposed on two opposite sides and adjacent to the fingerprint identification chip 2, so as to provide balanced support. Specifically, the first fastening unit 121 can include two or three fastening members 1211 disposed on different sides corresponding to the fingerprint identification chip 2 to effectively support and fix the fingerprint identification chip 2.

The specific structure of the first fastening members 1211 of the first fastening unit 121 can be adjusted according to requirements. For example, in the embodiment shown in FIG. 5, the first fastening member 1211 is a protrusion, and the protrusion has a first stopping surface, that is, the first fastening member 1211 has a first stopping surface 12111. As shown in FIG. 5, the first stopping surface 12111 and the rear surface 22 of the fingerprint identification chip 2 are oriented in opposite directions. In this way, the first stopping surface 12111 can be closely adjacent to (abutting against) at least a portion of the rear surface 22 of the fingerprint identification chip 2 so as to support the fingerprint identification chip 2.

Still, in other embodiments, the first fastening member 1211 can be a strip-shaped or elongated structure, such as a rib, formed surrounding the accommodating space 14. The structure of the first fastening member 1211 can vary as long as the fingerprint identification chip 2 can be effectively fixed in the accommodating space 14.

Figure 6:
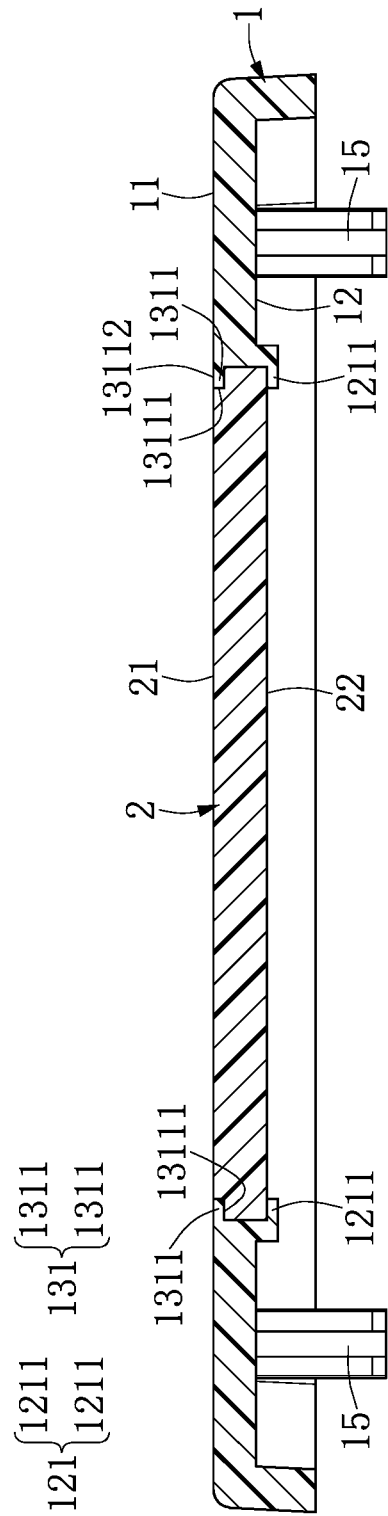
FIG. 6 is another cross-sectional assembled view of the keycap unit and the fingerprint identification chip of the fingerprint identification module according to the first embodiment of the present disclosure.

Next, reference is made to FIG. 6, which is another schematic cross-sectional view of the assembled keycap unit 1 and the fingerprint identification chip 2 in the fingerprint identification module M provided by the first embodiment of the present disclosure. By comparing FIG. 6 with FIGS. 4 and 5, it can be seen that the structure of the keycap unit 1 shown in FIG. 6 is different from that shown in FIGS. 4 and 5. Specifically, the keycap unit 1 shown in FIG. 6 has, in addition to the first fastening unit 121 shown in FIG. 5, a second fastening unit 131 disposed on the first surface 13.

Specifically, in the embodiment shown in FIG. 6, the keycap unit 1 includes a second fastening unit 131 disposed on the first surface 13, and the second fastening unit 131 includes at least two second fastening members 1311. In certain embodiments of the present disclosure, the keycap unit 1 uses not only the first fastening unit 121 to prevent the fingerprint identification chip 2 from disengaging from the keycap unit 1 due to a downward pressing force, but also the second fastening unit 131 to prevent the fingerprint identification chip 2 from disengaging from the keycap unit 1 due to an upward lifting force (along a direction from the supporting surface 12 to the pressing surface 11) during using or assembling the fingerprint identification chip 2.

Through the cooperation of the first fastening unit 121 and the second fastening unit 131, the fingerprint identification chip 2 and the keycap unit 1 are fixed to each other. In other words, the fingerprint identification chip 2 is fastened between the first fastening unit 121 and the second fastening unit 131.

For example, the second fastening members 1311 can be disposed along the first surface 13 of the keycap unit 1. In other words, the second fastening members 1311 can surround the fingerprint identification chip 2 disposed in the accommodating space 14 and form a rib circling the periphery of the accommodating space 14. Further, the second fastening unit 131 surrounds the sensing surface 21 of the fingerprint identification chip 2.

It should be noted that, in order to effectively fix the fingerprint identification chip 2 through the adoption of the second fastening unit 131 and to ensure the adoption of the second fastening unit 131 not affecting the user experience and performance of the fingerprint identification module M, in addition to making an upper surface 13112 of the second fastening member 1311 of the second fasting unit 131 parallel to the pressing surface 11 of the keycap unit 1, the structure of the fingerprint identification chip 2 being adjacent to the sensing surface 21 also needs to be adaptively adjusted.

In the embodiment shown in FIG. 6, the second fastening unit 131 includes two second fastening members 1311 disposed on two opposite sides of the first surface 13. Each of the second fastening members 1311 is in an elongated or strip shape and has a second stopping surface formed by two or more surfaces extending along different planes, for example, the surfaces 13111, and therefore, the second stopping surface is not limited to a single flat surface. As shown in FIG. 6. Each of the second stopping surfaces abuts against the fingerprint identification chip 2.

As shown in FIG. 6, each of the second stopping surfaces is formed by two mutually perpendicular surfaces, for example, the surfaces 13111, which are respectively parallel to the pressing surface 11 of the keycap unit 1 and the first surface 13 of the keycap unit 1.

However, the specific structure of the second stopping surfaces is not limited to any example provided above in the present disclosure. The embodiment shown in FIG. 6 is an exemplary structure of the second stopping surfaces. Specifically, as shown in FIG. 6, each of the second stopping surfaces formed by two mutually perpendicular surfaces 13111 can apply forces in different directions (two mutually perpendicular directions) to the fingerprint identification chip 2. Therefore, the fingerprint identification chip 2 can be more firmly fixed in the accommodating space 14, and a better push-stopping effect can be attained.

In other embodiments of the present disclosure, the second stopping surface 13111 can also be a contacting surface which is neither parallel nor perpendicular to the pressing surface 11 of the keycap unit 1 and the first surface 13 of the keycap unit 1.

As previously described, the pressing surface 11 of the keycap unit 1 is flush with an upper surface 13112 of the second fastening members 1311. In order to achieve the above structural design, when the second fastening members 1311 is utilized to fix the fingerprint identification chip 2, it is necessary to design and adjust the structure of the fingerprint identification chip 2 before forming the assembly of the keycap unit 1 and the fingerprint identification chip 2, so that a structure of the fingerprint identification chip 2 being adjacent to the second fastening members 1311 matches with the second fastening members 1311. For example, referring to FIG. 6, the periphery of the sensing surface 21 of the fingerprint identification chip 2 can be cut to form a stepped structure. In the embodiment as shown in FIG. 6, two opposite edges of the sensing surface 21 of the fingerprint identification chip 2 are cut to form a stepped structure for matching with the second stopping surfaces 13111 of the second fastening members 1311.

Further, in order to manufacture the assembly of the keycap unit 1 and fingerprint identification chip 2 as shown in FIG. 6, the fingerprint identification chip 2 can be formed in advance by cutting, and the fingerprint identification chip 2 can be placed in a mold cavity of a mold. Then, the plastic material for forming the keycap unit 1 is filled in the mold cavity. In this way, in an assembly formed by such an insert molding technology, the keycap unit 1 has the second fastening unit 131 that matches with the fingerprint identification chip 2.

Through the design of the keycap unit 1 and the fingerprint identification chip 2 as shown in FIG. 6, the structural strength of the assembly of the keycap unit 1 combining with the fingerprint identification chip 2 in the fingerprint identification module M can be effectively improved. As a result, the fingerprint identification chip 2 does not easily detach from the keycap unit 1 during its manufacturing, transportation, storage, and use.

Second Embodiment

Next, reference is made to FIGS. 7 to 13, which show details in the second embodiment of the present disclosure. First, by comparing FIG. 7 with FIG. 4, it can be seen that one of the differences between the second embodiment and the first embodiment relates to the structural design of the keycap unit 1. Specifically, the keycap unit 1 in the first embodiment is designed with a hole, i.e., the accommodating space 14 penetrates the keycap unit 1, and the sensing surface 21 of the fingerprint identification chip 2 is exposed from the accommodating space 14. In contrast, in the second embodiment, a thin layer structure 18 is disposed between the pressing surface 11 of the keycap unit 1 and the sensing surface 21 of the fingerprint identification chip 2. The details of the thin layer structure 18 will be described later.

Figure 7:
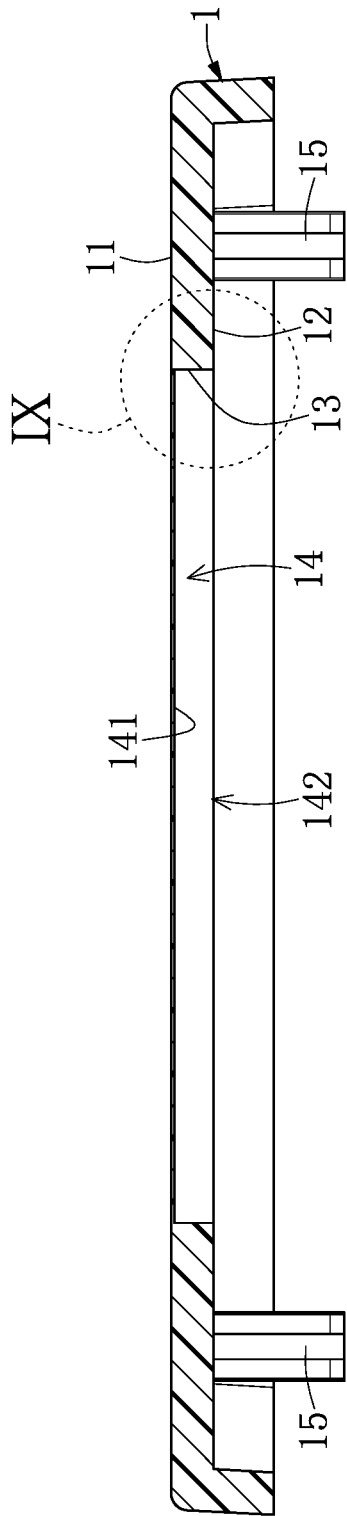
FIG. 7 is a cross-sectional assembled view of a keycap unit of a fingerprint identification module according to a second embodiment of the present disclosure.

It can be seen from FIG. 7 that in the second embodiment, the accommodating space 14 includes a groove recessed inwardly on the supporting surface 12, and the groove has an opening 142 surrounded by the supporting surface 12 and a third surface 141 corresponding to the opening 142. In other words, in the second embodiment of the present disclosure, the accommodating space 14 is the space inside the groove. Therefore, in FIG. 7, the position of the groove is indicated by the symbol 14 of the accommodating space 14.

Figure 8:
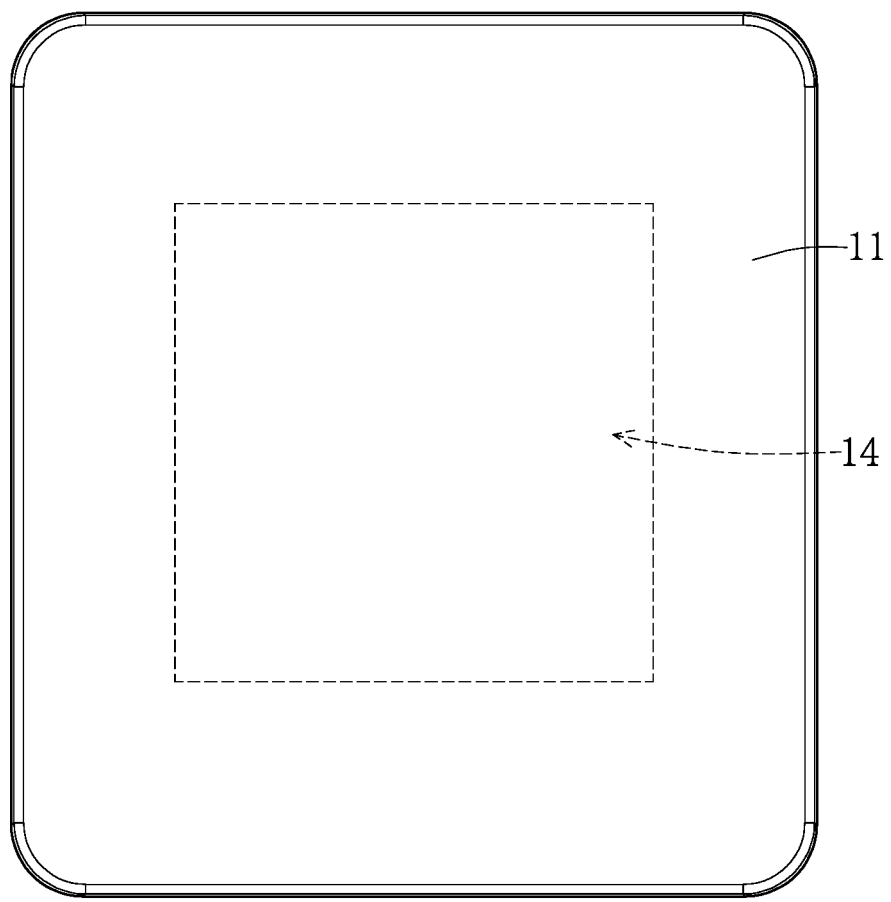
FIG. 8 is a top view of the keycap unit shown in FIG. 7.
Figure 9:
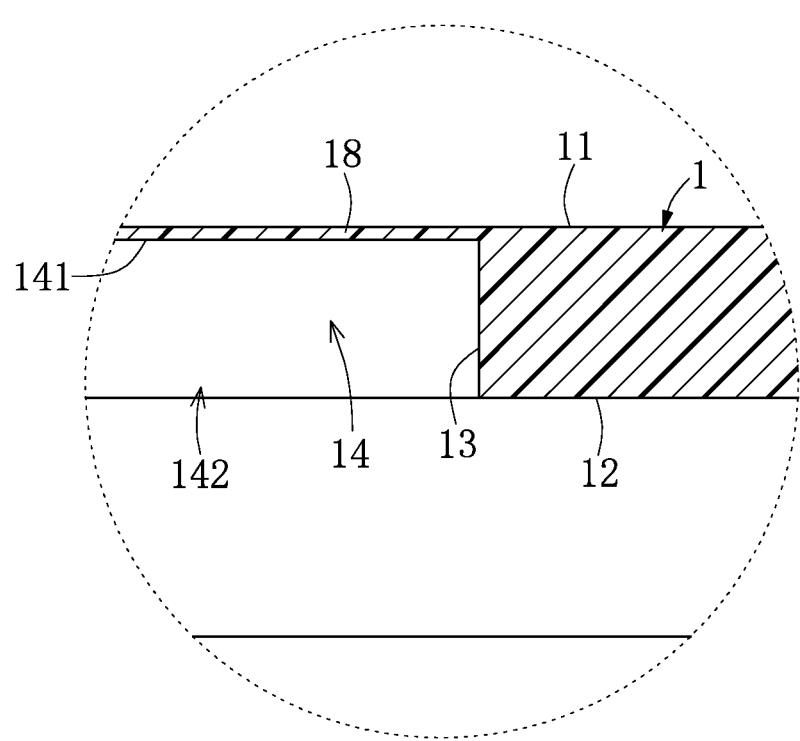
FIG. 9 is an enlarged view of the section IX in FIG. 7.

Reference is made to FIG. 7 to FIG. 10. FIG. 7 is a cross-sectional view of a keycap unit 1 in a fingerprint identification module M according to the second embodiment of the present disclosure. FIG. 8 is a top view of the keycap unit 1 shown in FIG. 7. FIG. 9 is an enlarged view of section IX in FIG. 7. FIG. 10 is an enlarged view of an assembly of the structure shown in FIG. 9 and the fingerprint identification chip 2.

In the embodiments shown in FIG. 7 to FIG. 10, the keycap unit 1 does not has a hole, while a thin layer structure 18 is provided between the pressing surface 11 of the keycap unit 1 and the sensing surface 21 of the fingerprint identification chip 2. The thin layer structure 18 can be made of a layered plastic material. As described above, the groove has an opening 142 surrounded by the supporting surface 12 and a third surface 141 corresponding to the opening 142, and the sensing surface 21 of the fingerprint identification chip 2 is closely adjacent to (abutting against) the third surface 141 of the groove.

Specifically, in the second embodiment of the present disclosure, the keycap unit 1 and the fingerprint identification chip 2 can also be integrally formed into one assembly by insert molding. For example, in the manufacturing process, the fingerprint identification chip 2 is first placed in a mold cavity of a mold, while the structure of the mold and the placing location of the fingerprint identification chip 2 in the mold are designed beforehand to reserve a space for the plastic material (the thin layer structure 18) to be formed between the sensing surface 21 of the fingerprint identification chip 2 and the pressing surface 11 of the keycap unit 1. As a result, after performing insert molding, an assembly of the keycap unit 1 and the fingerprint identification chip 2 as shown in FIG. 7 can be formed.

Reference is made to FIG. 8. As shown in FIG. 8, since the keycap unit 1 is not formed with a hole in the second embodiment, only the pressing surface 11 of the keycap unit 1 is visible in the top view. In addition, the broken line in FIG. 8 indicates the position of the accommodating space 14 (the groove) below the pressing surface 11 of the keycap unit 1.

Next, reference is made to FIG. 9 and FIG. 10. FIG. 9 is an enlarged view of the section IX in FIG. 7. FIG. 10 further shows the fingerprint identification chip 2 disposed in the accommodating space 14 of the keycap unit 1 shown in FIG. 7. As shown in FIG. 9 and FIG. 10, the second surface 23 of the fingerprint identification chip 2 is closely adjacent to (abutting against) the first surface 13 of the keycap unit 1, and the sensing surface 21 of the fingerprint identification chip 2 is closely adjacent to (abutting against) the groove (the accommodating space 14) of the keycap unit 1. In this way, the structural design of the assembly of the keycap unit 1 and the fingerprint identification chip 2 of the second embodiment of the present disclosure can also achieve gapless, antistatic, dust-proof, and easy-assembling effects.

It is worth mentioning that even if the thin layer structure 18 is provided between the sensing surface 21 of the fingerprint identification chip 2 and the pressing surface 11 of the keycap unit 1, the thickness of the thin layer structure 18 should be enough for the fingerprint identification chip 2 to perform fingerprint identifying operation. Therefore, in certain embodiments of the present disclosure, the thickness of the thin layer structure 18, that is, the distance between the pressing surface 11 and the sensing surface 21 can be, for example, from 0.05 millimeters (mm) to 0.25 mm. However, the present disclosure is not limited to such a range.

Figure 11:
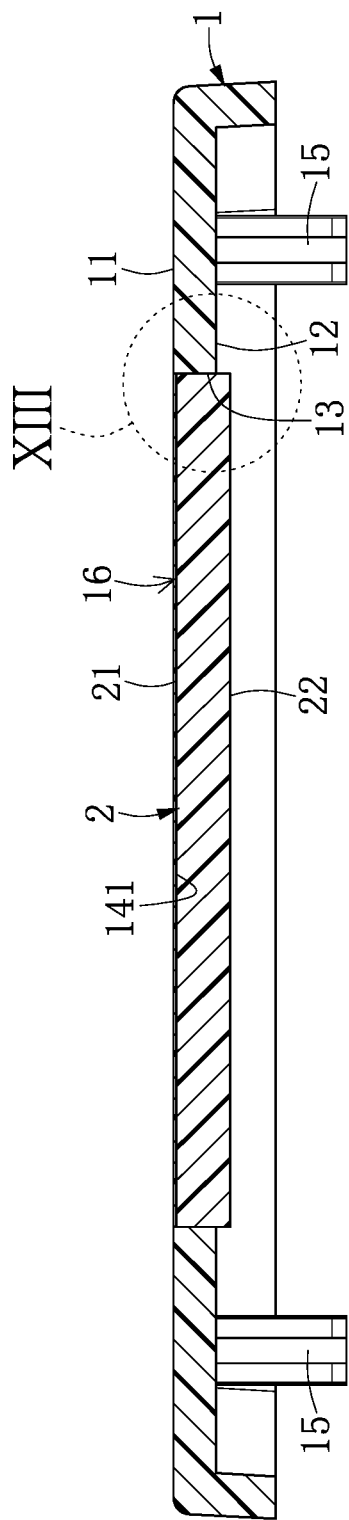
FIG. 11 is a cross-sectional assembled view of the keycap unit and the fingerprint identification chip of the fingerprint identification module according to the second embodiment of the present disclosure.
Figure 12:
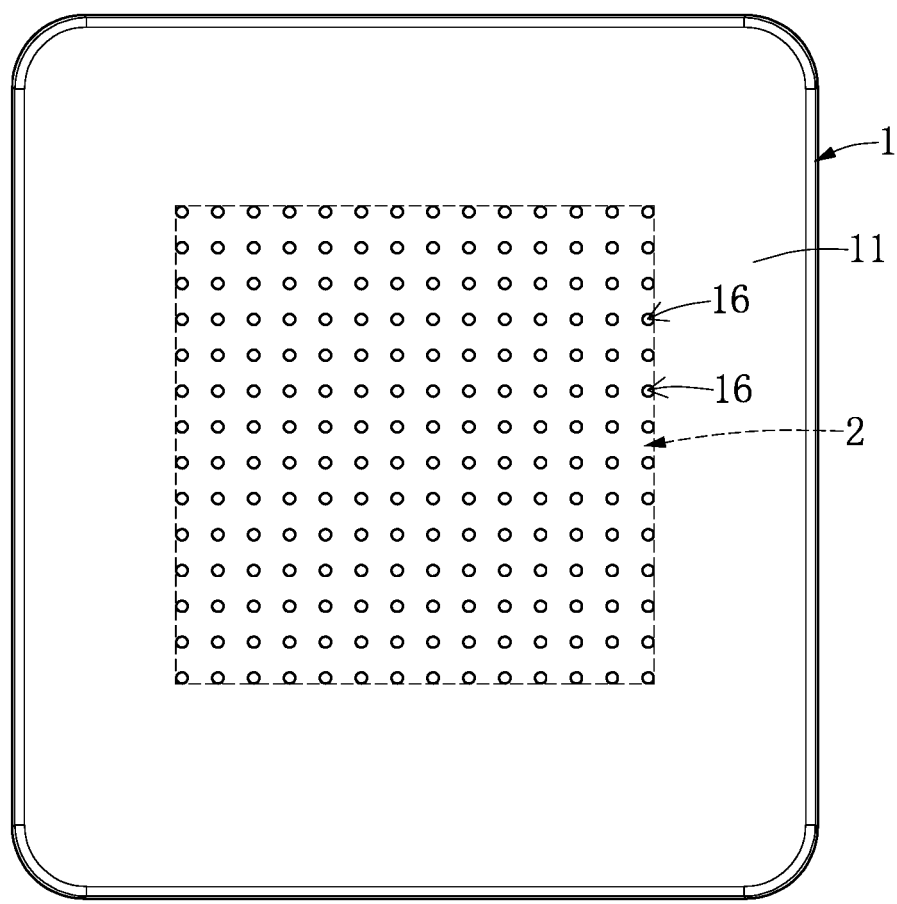
FIG. 12 is a top view of the assembly of the keycap unit and the fingerprint identification chip shown in FIG. 11.
Figure 13:
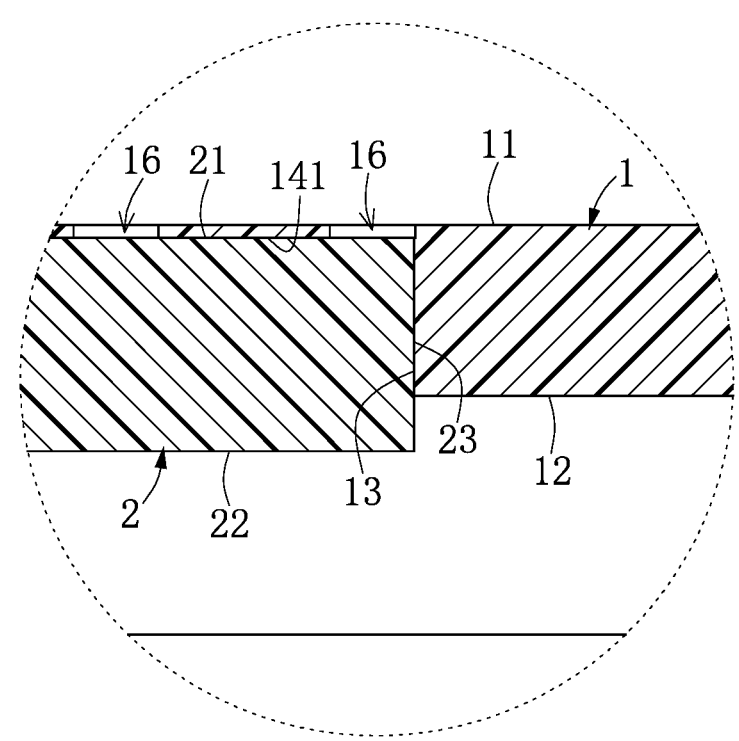
FIG. 13 is an enlarged view of the section XIII in FIG. 11.

Next, reference is made to FIG. 11 to FIG. 13. FIG. 11 is a cross-sectional view of an assembly of the keycap unit 1 and the fingerprint identification chip 2 in the fingerprint identification module M according to the second embodiment of the present disclosure. FIG. 12 is a top view of the assembly of the keycap unit 1 and the fingerprint identification chip 2 as shown in FIG. 11. FIG. 13 is an enlarged view of the section XIII in FIG. 11.

FIG. 11 to FIG. 13 show another configuration of the second embodiment of the present disclosure. By comparing FIG. 11 with FIG. 7, it can be seen that one of the differences between the embodiments shown in FIG. 11 and FIG. 7 is that the keycap unit 1 in FIG. 11 has a plurality of through holes 16 located on the pressing surface 11. Specifically, the keycap unit 1 has a plurality of through holes 16 penetrating through the keycap unit 1 and connected between the pressing surface 11 and the third surface 141.

The design of the through holes 16 can make the sensing effect of the fingerprint identification chip 2 more significant. As shown in the top view of FIG. 12, a portion of the pressing surface 11 of the keycap unit 1 corresponding to the accommodating space 14 is formed with the plurality of through holes 16. The structure design, the arrangement, and the molding method of the through holes 16 are not limited in the present disclosure, and the structure(s) shown in the drawings is only one embodiment of the through holes 16. For example, the plurality of through holes 16 can be subsequently formed by a machining process. For example, the through holes 16 can be formed by laser engraving, injection molding, mechanical stamping, or the like. However, the above processing procedures are not intended to limit the scope of the present disclosure.

Figure 14:
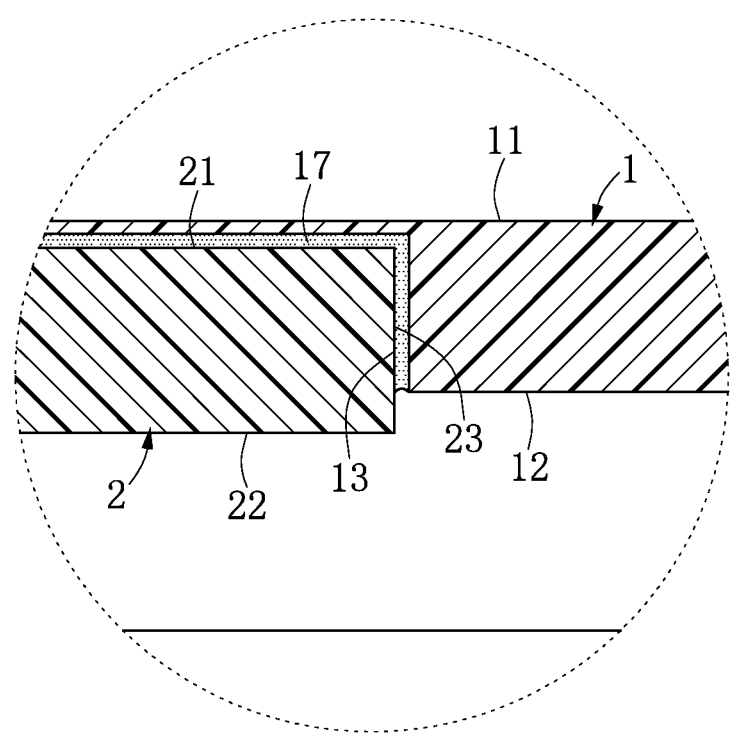
FIG. 14 is a cross-sectional view of the assembly of the keycap unit and the fingerprint identification chip shown in FIG. 13 according to another configuration of the present disclosure.

Next, reference is made to FIG. 14, which is a cross-sectional view of another configuration of the assembly of the keycap unit 1 and the fingerprint identification chip 2 shown in FIG. 13. In other words, FIG. 14 shows another configuration of the second embodiment of the present disclosure.

In the configuration shown in FIG. 14, the keycap unit 1 further includes an adhesive layer 17, and the first surface 13 of the keycap unit 1 is located on the adhesive layer 17. Specifically, in the configuration shown in FIG. 14, the keycap unit 1 includes, in addition to a main body formed of a plastic material, an adhesive layer 17 provided on a side of the keycap unit 1 closer to the supporting surface 12. The keycap unit 1 can be fixed to the fingerprint identification chip 2 through the adhesive layer 17, so as to prevent the fingerprint identification chip 2 from detaching from the keycap unit 1 during its manufacturing or use.

Further, different components in the assembly of the keycap unit 1 and the fingerprint identification chip 2 shown in FIG. 14 can be separately formed. For example, the keycap unit 1 that does not include the adhesive layer 17 can be first formed by injection molding. Then, the adhesive layer 17 is disposed on the side of the keycap unit 1 closer to the supporting surface 12, and an exposed surface of the adhesive layer 17 serves as the first surface 13 of the keycap unit 1. Next, the fingerprint identification chip 2 is disposed in the accommodating space 14, and the second surface 23 of the fingerprint identification chip 2 is closely adjacent to (abutting against) the first surface 13 that is located on the adhesive layer 17. In this way, in the configuration shown in FIG. 14, the extent of tightness between the fingerprint identification chip 2 and the keycap unit 1 can still be ensured to be sufficient to attain static-proof and dust-proof effects.

One of the beneficial effects of the present disclosure is that, through the technical features of "at least a portion of the second surface 23 of the fingerprint identification chip 2 abuts against the first surface 13 of the keycap unit 1," the tightness between the fingerprint identification chip 2 and the keycap unit 1 can be ensured.

Further, the fingerprint identification module M provided by the present disclosure includes a keycap unit 1 and a fingerprint identification chip 2. The fingerprint identification chip 2 is fixed in the accommodating space 14 of the keycap unit 1. In one embodiment of the present disclosure, the keycap unit 1 and the fingerprint identification chip 2 are fixed to each other to form an assembly while the keycap unit 1 is formed through mold inserting. Through designing the detailed structure of the keycap unit 1, the embodiment of the present disclosure can also effectively avoid the detachment of the fingerprint identification chip 2 from the keycap unit 1 during its manufacturing or use, thereby significantly improving the stability of the product of the present disclosure.

Further, in the present disclosure, the keycap unit 1 and the fingerprint identification chip 2 which already has support members 15 are combined with each other to form an assembly. As a result, the fingerprint identification module M of the present disclosure, in comparison with conventional techniques, has a lower manufacturing cost, lower complexity, and higher assembling accuracy and precision. Since no gap is present between the keycap unit 1 and the fingerprint identification chip 2, the fingerprint identification module M prevents external materials, such as dust or moisture, from intruding into the interior of the fingerprint identification module M, thereby the using efficacy of the fingerprint identification module M is ensured.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A fingerprint identification module, comprising:
    a keycap unit having:
        an accommodating space;
        a first surface corresponding to the accommodating space;
        a pressing surface;
        a supporting surface opposite to the pressing surface;
        at least one supporting member integrally formed on the supporting surface; and
        a first fastening unit disposed on the supporting surface; and
    a fingerprint identification chip having a second surface and disposed in the accommodating space to be fixed in the accommodating space through the first fastening unit,
    wherein at least a portion of the second surface of the fingerprint identification chip abuts against the first surface of the keycap unit;
    wherein the pressing surface of the keycap unit is aligned with a sensing surface of the fingerprint identification chip in a horizontal direction.

2. The fingerprint identification module according to claim 1,
    wherein the accommodating space and the first surface are located between the pressing surface and the supporting surface, the first surface surrounds the accommodating space, and the fingerprint identification chip further has a rear surface opposite to the sensing surface.

3. The fingerprint identification module according to claim 2, wherein the accommodating space penetrates the keycap unit, and the sensing surface of the fingerprint identification chip is exposed from the accommodating space.

4. The fingerprint identification module according to claim 2, wherein the accommodating space includes a groove recessed inwardly on the supporting surface, the groove has an opening surrounded by the supporting surface and a third surface corresponding to the opening.

5. The fingerprint identification module according to claim 4, wherein the sensing surface of the fingerprint identification chip abuts against the third surface of the groove.

6. The fingerprint identification module according to claim 4, wherein the keycap unit further includes an adhesive layer, and the first surface is located on the adhesive layer.

7. The fingerprint identification module according to claim 4, wherein the keycap unit has a plurality of through holes penetrating the keycap unit and connected between the pressing surface and the third surface.

8. The fingerprint identification module according to claim 2, further comprising a photocured layer disposed on the pressing surface of the keycap unit and the sensing surface of the fingerprint identification chip.

9. The fingerprint identification module according to claim 2, wherein the first fastening unit includes at least two first fastening members, each of the first fastening members has a first stopping surface abutting against at least a portion of the rear surface of the fingerprint identification chip so as to support the fingerprint identification chip.

10. The fingerprint identification module according to claim 2, wherein the keycap unit includes a second fastening unit disposed on the first surface, the second fastening unit includes two second fastening members, each of the second fastening members has at least two second stopping surfaces, each of the at least two stopping surfaces abuts against the fingerprint identification chip, and the pressing surface of the keycap unit is flush with an upper surface of each of the second fastening members.

11. The fingerprint identification module according to claim 10, wherein the fingerprint identification chip is fastened between the first fastening unit and the second fastening unit.

12. The fingerprint identification module according to claim 1, wherein the fingerprint identification chip further has a sensing surface and a rear surface opposite to the sensing surface, the second surface surrounds the sensing surface and the rear surface, and the sensing surface produces a corresponding sensing signal according to a touch operation.

13. A fingerprint identification module, comprising:
    a keycap unit having:
        an accommodating space;
        a first surface corresponding to the accommodating space;
        a pressing surface;
        a supporting surface opposite to the pressing surface;
        at least one supporting member integrally formed on the supporting surface; and
        a first fastening unit disposed on the supporting surface; and
    a fingerprint identification chip having a second surface and disposed in the accommodating space,
    wherein at least a portion of the second surface of the fingerprint identification chip abuts against the first surface of the keycap unit;
    wherein a thin layer structure is disposed between the pressing surface of the keycap unit and the sensing surface of the fingerprint identification chip.

14. A fingerprint identification module, comprising:
    a keycap unit having:
        an accommodating space;
        a first surface corresponding to the accommodating space;
        a pressing surface;
        a supporting surface opposite to the pressing surface;
        at least one supporting member integrally formed on the supporting surface; and a first fastening unit disposed on the supporting surface; and a fingerprint identification chip having a second surface and disposed in the accommodating space, wherein at least a portion of the second surface of the fingerprint identification chip abuts against the first surface of the keycap unit;

wherein a thin layer structure is aligned with the pressing surface of the keycap unit in a horizontal direction, so as to cover the sensing surface of the fingerprint identification chip.

\* \* \* \* \*